Feb. 25, 1936.　　　A. B. KEMPEL　　　2,031,960
RUBBER REPAIR MATERIAL
Filed Jan. 21, 1935
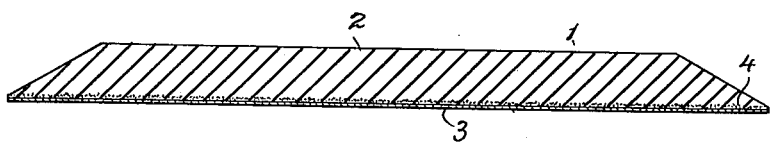
Inventor,
A. B. Kempel,
By Robert M. Pierson
Attorney Patented Feb. 25, 1936

2,031,960

UNITED STATES PATENT OFFICE 2,031,960

RUBBER REPAIR MATERIAL

Arthur B. Kempel, East Brady, Pa., assignor to Rex-Hide, Incorporated, East Brady, Pa., a corporation of Pennsylvania Application January 21, 1935, Serial No. 2,703

3 Claims. (Cl. 91—68)

This invention relates to rubber repair materials or elements including unvulcanized pneumatic tire retreading strips known in the trade as "camel-back".

My object is to provide an attaching surface on the rubber element, of sufficient adhesiveness to provide a firm vulcanized union with a tire carcass or other base, without the necessity of laminating the attaching face with a layer of pure-gum stock. Retread strips without the pure-gum attaching layer have heretofore been used to some extent in the cheaper stocks, but tread stocks of good quality, which are rather highly compounded with materials such as carbon black and zinc oxide, have not sufficient inherent tackiness to obtain a thoroughly satisfactory vulcanized joint by direct union with the base element.

The accompanying drawing represents a cross section of a rubber repair element 1 consisting of a retread strip 2 of suitable rubber composition adapted to be made in accordance with my invention and provided with the usual removable protecting layer or strip 3 of glazed material such as holland cloth, pyroxylin or the like.

At a suitable stage in the preparation of the composite element 1, as when the rubber strip 2 is being extruded from a tubing machine, and before application of the protective strip 3, the base or attaching face of the rubber strip is coated, as by painting or spraying, with an oil which will penetrate, soften and physically combine in solution with the rubber. The resulting base-layer compound is highly tacky and in the nature of a solid solution of oil and rubber as distinguished from a dispersion with an incompatible oil such as petroleum forming a rubber mixture which is merely slippery.

The preferred oil should have a boiling point so high that it will not be substantially lost by vaporization during the vulcanizing process, and should also preferably be a solvent or carrier of sulphur. Oils which have been found to fill the requirements are terpenes, including oil of turpentine, or mixtures thereof with other compatible substances of a generally similar chemical nature. These are unsaturated hydrocarbon of the class formula $C_{10}H_{16}$, containing no oxygen or hydroxyl groups in the structural formula, and are closely related chemically to caoutchouc and gutta percha.

The most active single chemical constituent of several preferred oils available for the purpose is dipentene, having a boiling point of 181° C., although other chemically analogous substances such as pinene, having a boiling point of 155° C., or limonene, which is a distillation product of citrous fruits, with a boiling point of 175° C., might be used in whole or in part, although generally more expensive than the preferred substance.

While several oils which are obtained from pine trees and marketed under various trade names would or might serve the purpose, I have obtained good results from one known as "Solvenol", consisting chiefly of dipentene, together with small quantities of pinene, terpinene, terpinolene and cymene. This has a specific gravity at 15.5° C. of 8.50 to 8.66, and a boiling point of not less than 165° C., namely a boiling point or points such that approximately 90% distills below 190° C., 95% distills below 200° C. and the liquid boils dry at 212° C.

The mixture or solid solution of the rubber with the oil is indicated on the drawing by a shallow stippled layer at 4, the depth of penetration probably being of the order of 1/64 of an inch. The effect is to provide a highly tacky attaching or base surface on the unvulcanized rubber strip 2 which gives a very tenacious vulcanized union with the used tire carcass in a retreading operation.

Immediately after applying the oil coating to the rubber strip 2, the protective layer 3 of holland or the like is rolled onto said strip. Thereafter the diffusion or penetration of the oil into the rubber continues and the protective strip acts to prevent or retard the escape of the oil by slow evaporation to any substantial extent, so that these protected retread strips may be kept in stock for a comparatively long time without deterioration. The invention provides a vulcanized joint as good as or better than that afforded by the ordinary pure-gum attaching layer and at considerably less expense.

My invention may be applied to rubber elements for repairing and other purposes, besides retread strips, and various changes in the described specific embodiment may be made without departing from the scope of the invention as defined in the claims.

I claim:

1. Repair material comprising an unvulcanized rubber element having incorporated in its attaching face a stable terpene oil forming a solid, tacky solution with the rubber.

2. Repair material comprising an unvulcanized rubber element having dissolved in its attaching face an oil which is chiefly dipentene.

3. Repair material comprising an unvulcanized rubber element having dissolved in its attaching face an oil which is chiefly dipentene, together with pinene, terpinene, terpinolene and cymene in minor proportion.

ARTHUR B. KEMPEL.